United States Patent
Aldridge et al.

(10) Patent No.: US 12,425,287 B2
(45) Date of Patent: Sep. 23, 2025

(54) METHOD OF AND SYSTEM FOR INTERFERENCE WITH A TRANSMISSION OF AN ORTHOGONAL FREQUENCY-DIVISION MULTIPLEX (OFDM) SIGNAL

(71) Applicant: Rohde & Schwarz GmbH & Co. KG, Munich (DE)

(72) Inventors: Chris Aldridge, Singapore (SG); Rajashekar Durai, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 528 days.

(21) Appl. No.: 17/817,233

(22) Filed: Aug. 3, 2022

(65) Prior Publication Data

US 2024/0048425 A1    Feb. 8, 2024

(51) Int. Cl.
   *H04L 27/26* (2006.01)
(52) U.S. Cl.
   CPC ...... *H04L 27/2646* (2013.01); *H04L 27/2602* (2013.01)
(58) Field of Classification Search
   CPC .................. H04L 27/2646; H04L 27/2602
   See application file for complete search history.

(56) References Cited

U.S. PATENT DOCUMENTS

| | | |
|---|---|---|
| 2005/0030226 A1 | 2/2005 | Miyamoto et al. |
| 2012/0028821 A1 | 2/2012 | Jaenisch et al. |

(Continued)

FOREIGN PATENT DOCUMENTS

| | | |
|---|---|---|
| BR | PI0702742 A2 | 5/2011 |
| BR | PI1004546 A2 | 12/2012 |

(Continued)

OTHER PUBLICATIONS

H. Rahbari, M. Krunz and L. Lazos, "Swift Jamming Attack on Frequency Offset Estimation: The Achilles' Heel of OFDM Systems," in IEEE Transactions on Mobile Computing, vol. 15, No. 5, pp. 1264-1278, May 1, 2016, doi: 10.1109/TMC.2015.2456916. (Year: 2016).*

(Continued)

*Primary Examiner* — Ayman A Abaza
*Assistant Examiner* — Benjamin T. Ranew
(74) *Attorney, Agent, or Firm* — DITTHAVONG, STEINER & MLOTKOWSKI

(57) ABSTRACT

Disclosed are a method of and a system for interference with a transmission of an OFDM signal comprising multiple data frames which respectively comprise a preceding frame preamble and a succeeding frame preamble. The method comprises: receiving a succeeding frame preamble of a first data frame of the multiple data frames; identifying a first radio power and a first equalization parameter associated with the received succeeding frame preamble; determining a second radio power on a same order of magnitude as the first radio power, and a second equalization parameter differing from the first equalization parameter; receiving a preceding frame preamble of a second data frame of the multiple data frames; and retransmitting the succeeding frame preamble of the first data frame concurrently with a succeeding frame preamble of the second data frame. The retransmitted succeeding frame preamble comprises the second radio power and the second equalization parameter.

14 Claims, 3 Drawing Sheets

(56) References Cited

U.S. PATENT DOCUMENTS

| | | |
|---|---|---|
| 2012/0032876 A1 | 2/2012 | Tabe |
| 2013/0157729 A1 | 6/2013 | Tabe |
| 2013/0237272 A1 | 9/2013 | Prasad |
| 2014/0111147 A1 | 4/2014 | Soar |
| 2014/0128032 A1 | 5/2014 | Muthukumar |
| 2014/0278026 A1 | 9/2014 | Taylor |
| 2015/0294046 A1 | 10/2015 | Rawlins |
| 2016/0054219 A1 | 2/2016 | Blaha et al. |
| 2019/0154439 A1 | 5/2019 | Binder |
| 2019/0385057 A1 | 12/2019 | Litichever et al. |
| 2020/0294401 A1 | 9/2020 | Kerecsen |
| 2021/0374563 A1 | 12/2021 | Jezewski |
| 2022/0046228 A1 | 2/2022 | Haskin et al. |

FOREIGN PATENT DOCUMENTS

| | | |
|---|---|---|
| DE | 102018116174 A1 | 2/2020 |
| EP | 3662331 A2 | 6/2020 |
| IN | 00549MU2010 A | 7/2010 |
| IN | 02447CH2012 A | 3/2014 |
| IN | 01662CH2013 A | 11/2014 |
| WO | 10096628 A1 | 8/2010 |
| WO | 12143936 A1 | 10/2012 |
| WO | 19028269 A2 | 2/2019 |
| WO | 20243823 A2 | 12/2020 |
| WO | 21048459 A1 | 3/2021 |
| WO | 21097253 A1 | 5/2021 |
| WO | 2022/029196 A1 | 2/2022 |

OTHER PUBLICATIONS

Z. Zhang and M. Krunz, "Preamble Injection and Spoofing Attacks in Wi-Fi Networks," 2021 IEEE Global Communications Conference (GLOBECOM), Madrid, Spain, 2021, pp. 1-6, doi: 10.1109/GLOBECOM46510.2021.9685461. (Year: 2021).*

* cited by examiner

METHOD OF AND SYSTEM FOR INTERFERENCE WITH A TRANSMISSION OF AN ORTHOGONAL FREQUENCY-DIVISION MULTIPLEX (OFDM) SIGNAL

TECHNICAL FIELD

The present disclosure relates to wireless transmission, and in particular to a method of interference with a transmission of an OFDM signal, as well as to a corresponding system.

BACKGROUND ART

Remotely controlled unmanned aerial vehicles (UAV) more commonly known as drones may be unsolicited in a vicinity of critical infrastructure such as airports, for instance. As a counter-measure, a signal-to-noise ratio of the radio communications used for remote control may deliberately be decreased (radio jamming). For example, in case of a drone being controlled via WLAN connectivity, one could transmit a jamming signal such as a more powerful unmodulated or modulated carrier (using BPSK, MSK or QPSK) with some random sequence on the intended WLAN channel as the remote control transmission is active. However, even inexperienced users may easily detect such jamming attempts, for example using a WIFI spectrum analyzer app on their smartphone, and switch to a different WLAN channel accordingly to avoid further jamming.

SUMMARY

In view of the above-mentioned drawbacks and limitations, the present disclosure particularly seeks to further improve a defense against unsolicited OFDM communications as well as drones being remotely controlled via the same.

This objective is achieved by the embodiments as defined by the appended independent claims. Preferred embodiments are set forth in the dependent claims and in the following description and drawings.

A first aspect of the present disclosure relates to a method of interference with a transmission of an Orthogonal Frequency-Division Multiplex, OFDM, signal. The OFDM signal comprises multiple data frames which respectively comprise a preceding frame preamble and a succeeding frame preamble. The method comprises: receiving a succeeding frame preamble of a first data frame of the multiple data frames; identifying a first radio power and a first equalization information associated with the received succeeding frame preamble; determining a second radio power on a same order of magnitude as the first radio power, and a second equalization parameter differing from the first equalization parameter; receiving a preceding frame preamble of a second data frame of the multiple data frames; and retransmitting the succeeding frame preamble of the first data frame concurrently with a succeeding frame preamble of the second data frame. The retransmitted succeeding frame preamble comprises the second radio power and the second equalization parameter.

The second radio power may be no more than 1.5 dB higher than the first radio power.

The second equalization parameter may be orthogonal to the first equalization parameter.

The second equalization parameter may be time-variant.

The method may further comprise: identifying a first frequency information associated with the received succeeding frame preamble; and determining a second frequency offset differing from the first frequency offset. The retransmitted succeeding frame preamble may further comprise the second frequency offset.

The OFDM signal may comprise an IEEE 802.11 Wireless Local Area Network, WLAN, signal.

The OFDM signal may comprise a 3GPP cellular Radio Access Network, RAN, signal.

A second aspect of the present disclosure relates to a system for interference with a transmission of an Orthogonal Frequency-Division Multiplex, OFDM, signal. The OFDM signal comprises multiple data frames which respectively comprise a preceding frame preamble and a succeeding frame preamble. The system comprises a radio transceiver, being configured to: receive a succeeding frame preamble of a first data frame of the multiple data frames; and identify a first radio power and a first equalization information associated with the received succeeding frame preamble. The system further comprises a processor, being configured to: determine a second radio power on a same order of magnitude as the first radio power, and a second equalization parameter differing from the first equalization parameter. The radio transceiver is further configured to: receive a preceding frame preamble of a second data frame of the multiple data frames; and retransmit the succeeding frame preamble of the first data frame concurrently with a succeeding frame preamble of the second data frame. The retransmitted succeeding frame preamble comprises the second radio power and the second equalization parameter.

The second radio power may be no more than 1.5 dB higher than the first radio power.

The second equalization parameter may be orthogonal to the first equalization parameter.

The second equalization parameter may be time-variant.

The radio transceiver may further be configured to: identify a first frequency information associated with the received succeeding frame preamble; and the processor may further be configured to: determine a second frequency offset differing from the first frequency offset. The retransmitted succeeding frame preamble may further comprise the second frequency offset.

The OFDM signal comprises an IEEE 802.11 Wireless Local Area Network, WLAN, signal.

The OFDM signal comprises a 3GPP cellular Radio Access Network, RAN, signal.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
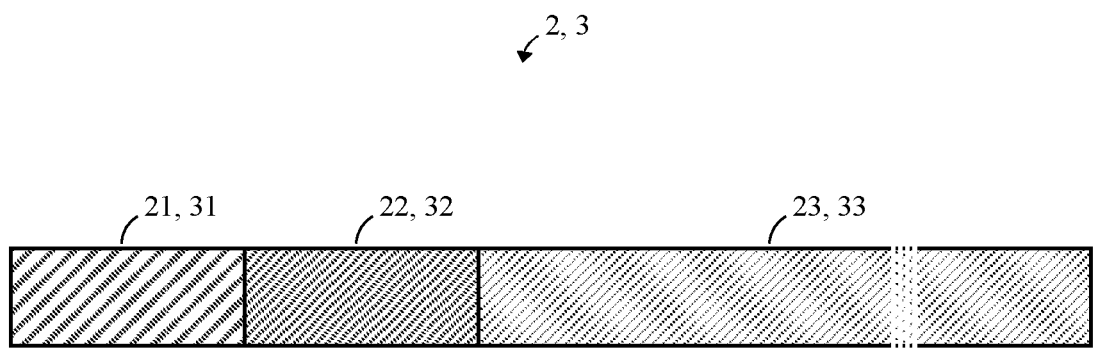

The drawings are to be regarded as being schematic representations, and elements illustrated in the drawings are not necessarily shown to scale. Rather, the various elements are represented such that their function and general purpose become apparent to those skilled in the art.

Figure 2:
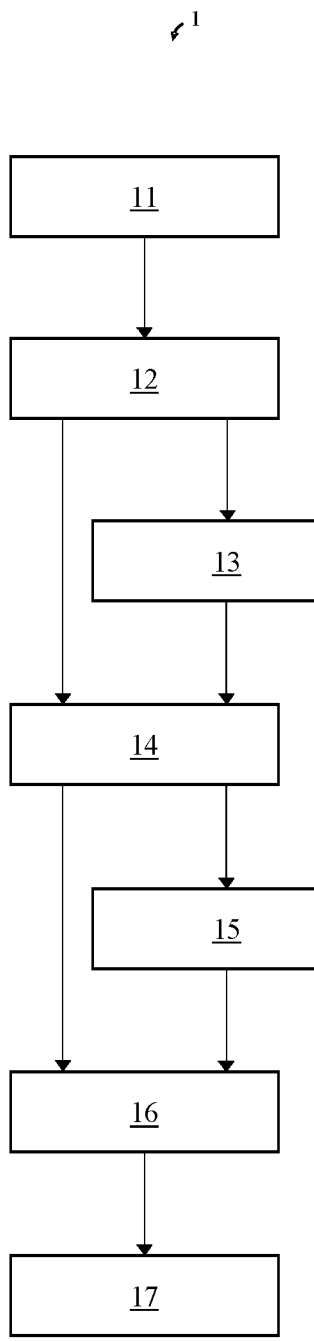
Figure 3:
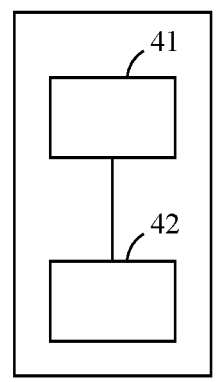

FIG. 1 schematically illustrates multiple exemplary data frames 2, 3 of an OFDM signal based on IEEE 802.11a/g/n;

FIG. 2 schematically illustrates a method 1 of interference with a transmission of an OFDM signal in accordance with the present disclosure; and FIG. 3 schematically illustrates a system 4 for interference with a transmission of an OFDM signal in accordance with the present disclosure.

Figure 4:
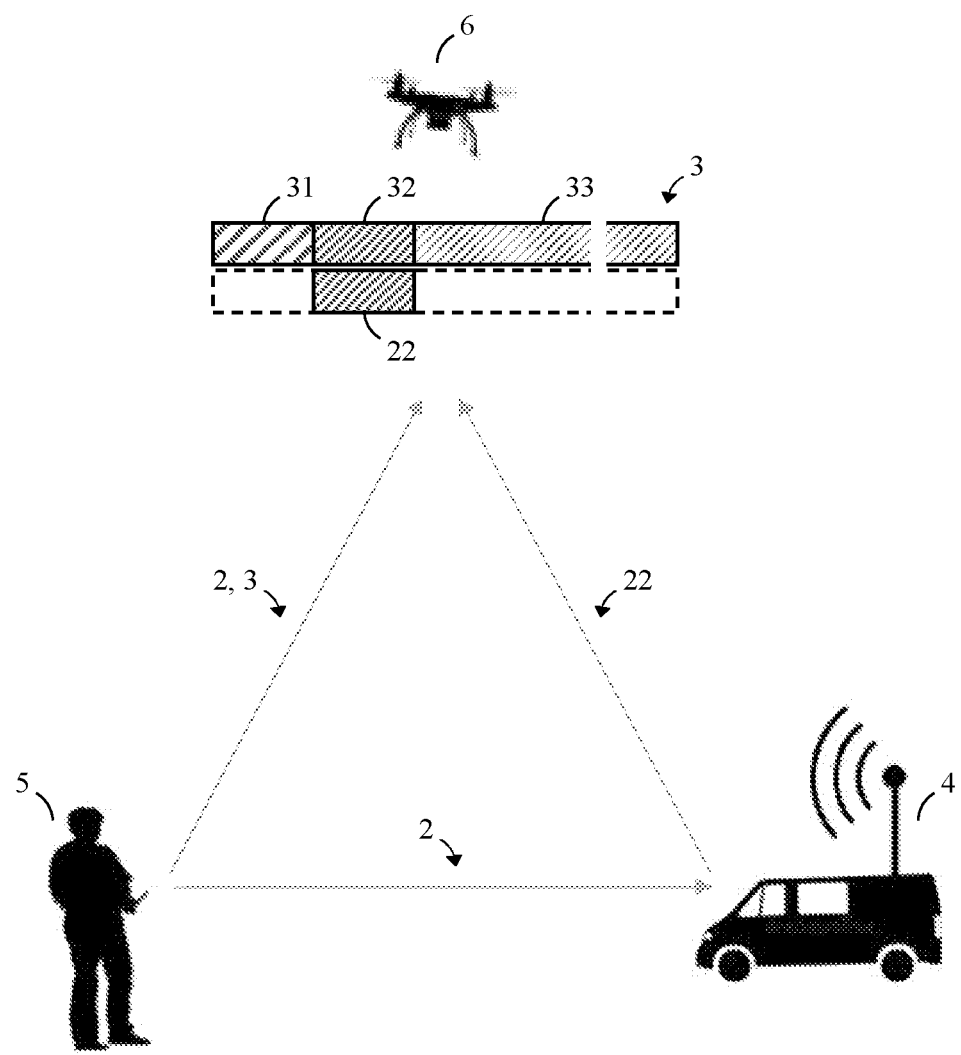

FIG. 4 schematically illustrates an exemplary scenario of interference with a transmission of an OFDM signal;

DETAILED DESCRIPTIONS OF DRAWINGS

FIG. 1 schematically illustrates multiple exemplary data frames 2, 3 of an OFDM signal based on IEEE 802.11a/g/n ("WLAN").

OFDM-based modulation schemes typically comprise a synchronization sequence that is primarily intended for measurement of received power, frequency error between transmitter and receiver, and channel profile.

The multiple data frames 2, 3 shown in FIG. 1 include such a synchronization sequence.

The multiple data frames 2, 3 have a same frame format. It begins with a short (or preceding) preamble 21, 31 sequence, followed by a long (or succeeding) preamble 22, 32 sequence, followed by a payload portion 23, 33.

The preceding preamble 21, 31 sequence includes a 16-sample signal that is repeated 10 times. The 16-sample sequence is derived from a Zadoff-Chu sequence and itself could be considered as 10 repeated OFDM symbols. A duration of the preceding preamble 21, 31 sequence is 8 μs.

The succeeding preamble 22, 32 sequence includes a 64-sample Zadoff-Chu sequence that is repeated 2.5 times, with the 0.5 partition preceding the whole partitions. A duration of the succeeding preamble 22, 32 sequence is 8 μs, too.

The payload portion 23, 33 includes a number of OFDM symbols, each of 4 μs duration, that convey the payload information. Note that while the payload portion 23, 33 can be encrypted, the preceding preamble 21, 31 sequence and the succeeding preamble 22, 32 sequence are not.

The purpose of the preceding preamble 21, 31 sequence and the succeeding preamble 22, 32 sequence are to allow a WLAN receiver to determine the presence of an OFDM transmission, and then to measure the received power, the frequency offset, and the equalization parameters (channel profile) on the known unencrypted sequences.

Zadoff-Chu signals have constant amplitude modulation and excellent cross-correlation properties that facilitate these measurements.

The equalization parameters (channel profile) are usually estimated from the succeeding preamble 22, 32 sequence.

The equalization parameters are important since they are required for OFDM demodulation of the payload portion 23, 33 of the received data frame 2, 3. When OFDM symbols have been through the Fast Fourier Transform (FFT) process, they need to be rotated according to the equalization profile coefficients to arrive at the correct signal constellation and to proceed with the channel decoding process.

FIG. 2 schematically illustrates a method 1 of interference with a transmission of an OFDM signal in accordance with the present disclosure.

The OFDM signal may comprise an IEEE 802.11 Wireless Local Area Network, WLAN, signal, or a 3GPP cellular Radio Access Network, RAN, signal.

The OFDM signal comprises multiple data frames 2, 3. A first data frame 2 of the multiple data frames 2, 3 comprises a preceding frame preamble 21 and a succeeding frame preamble 22. A second data frame 3 of the multiple data frames 2, 3 comprises a preceding frame preamble 31 and a succeeding frame preamble 32.

The method 1 comprises receiving 11 the succeeding frame preamble 22 of the first data frame 2 of the multiple data frames 2, 3.

The method 1 further comprises identifying 12 a first radio power and a first equalization information associated with the received succeeding frame preamble 22, and may further comprise identifying 13 a first frequency information associated with the received succeeding frame preamble 22.

The method 1 further comprises determining 14 a second radio power on a same order of magnitude as the first radio power, and a second equalization parameter differing from the first equalization parameter.

The second radio power may be no more than 1.5 dB higher than the first radio power.

The second equalization parameter may be orthogonal to the first equalization parameter, and may be time-variant.

The method 1 may further comprise determining 15 a second frequency offset differing from the first frequency offset.

The method 1 further comprises receiving 16 the preceding frame preamble 31 of the second data frame 3 of the multiple data frames 2, 3.

The method 1 further comprises retransmitting 17 the succeeding frame preamble 22 of the first data frame 2 concurrently with the succeeding frame preamble 32 of the second data frame 3.

The retransmitted succeeding frame preamble 32 comprises the second radio power and the second equalization parameter, and may further comprise the second frequency offset.

FIG. 3 schematically illustrates a system 4 for interference with a transmission of an OFDM signal in accordance with the present disclosure.

The OFDM signal comprises an IEEE 802.11 WLAN signal, or a 3GPP cellular RAN signal. OFDM is communications scheme wherein multiple closely spaced orthogonal subcarrier signals with overlapping spectra are frequency-division multiplexed to carry data in parallel. Demodulation is based on Fast Fourier Transform (FFT) algorithms. The effects of frequency-selective channel conditions, for example fading caused by multipath propagation, can be considered as constant (flat) over an OFDM sub-channel if the sub-channel is sufficiently narrow-banded. This enables frequency domain equalization at the receiver, basically requiring one complex valued multiplication per subcarrier and symbol.

The OFDM signal comprises multiple data frames 2, 3. A first data frame 2 of the multiple data frames 2, 3 comprises a preceding frame preamble 21 and a succeeding frame preamble 22. A second data frame 3 of the multiple data frames 2, 3 comprises a preceding frame preamble 31 and a succeeding frame preamble 32.

The system 4 comprises a radio transceiver 41, such as a WLAN transceiver, being configured to receive 11 the succeeding frame preamble 22 of the first data frame 2 of the multiple data frames 2, 3. A transceiver typically includes a transmitter unit and a receiver unit for bidirectional communications.

The radio transceiver 41 is further configured to identify 12 a first radio power and a first equalization information associated with the received succeeding frame preamble 22, and may further be configured to identify 13 a first frequency information associated with the received succeeding frame preamble 22.

The system 4 further comprises a processor 42, such as a central processing unit (CPU), a field-programmable gate array (FPGA), an application-specific integrated circuit (ASIC), a digital signal processor (DSP) and the like. The processor 42 is configured to: determine 14 a second radio power on a same order of magnitude as the first radio power, and a second equalization parameter differing from the first equalization parameter.

The second radio power may be no more than 1.5 dB higher than the first radio power.

The second equalization parameter may be orthogonal to the first equalization parameter, and may be time-variant.

The processor 42 may further be configured to determine 15 a second frequency offset differing from the first frequency offset.

The radio transceiver 41 is further configured to receive 16 the preceding frame preamble 31 of the second data frame 3 of the multiple data frames 2, 3.

The radio transceiver 41 is further configured to retransmit 17 the succeeding frame preamble 22 of the first data frame 2 concurrently with a succeeding frame preamble 32 of the second data frame 3.

The retransmitted succeeding frame preamble 22 comprises the second radio power and the second equalization parameter; and may further comprise the second frequency offset.

FIG. 4 schematically illustrates an exemplary scenario of interference with a transmission of an OFDM signal.

The scenario includes a system 4 for interference with a transmission of an OFDM signal, a drone operator having a remote control 5, and a remote-controlled drone 6.

The remote control 5 and the drone 6 are in communication with one another via an OFDM signal. The OFDM signal may comprise an IEEE 802.11 Wireless Local Area Network, WLAN, signal. Alternatively, the OFDM signal may comprise a 3GPP cellular Radio Access Network, RAN, signal.

The OFDM signal comprises multiple data frames 2, 3 which respectively comprise a preceding frame preamble 21, 31 and a succeeding frame preamble 22, 32.

According to the scenario, a first data frame 2 of the multiple data frames 2, 3 would initially be sent from the remote control 5 to the drone 6. It is assumed that the drone 6 as well as the system 4 are configured to receive the first data frame 2.

More specifically, the system 4 comprises a radio transceiver 41, being configured to receive 11 the succeeding frame preamble 22 of the first data frame 2 of the multiple data frames 2, 3; and to identify 12 a first radio power and a first equalization information associated with the received succeeding frame preamble 22. The radio transceiver 41 may further be configured to identify 13 a first frequency information associated with the received succeeding frame preamble 22;

The system 4 further comprises a processor 42, being configured to determine 14 a second radio power on a same order of magnitude as the first radio power, and a second equalization parameter differing from the first equalization parameter. The processor 42 may further be configured to determine 15 a second frequency offset differing from the first frequency offset.

The second radio power may be no more than 1.5 dB higher than the first radio power. In case the second radio power is higher, the interference might easily be detected from someone monitoring a use of the drone 6, whereas in case the second radio power is too low, the interference might not be effective.

The second equalization parameter may be orthogonal to the first equalization parameter. In particular, the second equalization parameter may be time-variant.

According to the scenario, a second data frame 2 of the multiple data frames 2, 3 would be sent subsequently from the remote control 5 to the drone 6. Again, it is presumed that the system 4 is configured to also receive the second data frame 2.

In particular, the radio transceiver 41 is further configured to receive 16 a preceding frame preamble 31 of the second data frame 3 of the multiple data frames 2, 3.

The radio transceiver 41 is further configured to retransmit 17 the succeeding frame preamble 22 of the first data frame 2 concurrently with a succeeding frame preamble 32 of the second data frame 3. The retransmitted succeeding frame preamble 22 comprises the second radio power and the second equalization parameter, and may further comprise the second frequency offset.

In summary, after initial listening to the WLAN transmission, at the time when the succeeding frame preamble 32 sequence of the second data frame is transmitted by the remote control 5, the succeeding frame preamble 22 sequence of the first data frame is retransmitted by the system 4, with some dummy equalization profile already impressed upon it, and optionally a dummy frequency error.

In other words, the system 4 sort of locks onto the frame structure of a well-standardized WLAN signal in order to quasi synchronize with the preceding and succeeding frame preambles 31, 32 and to interfere with the succeeding frame preamble 32.

These signals combine in the WLAN receiver of the drone 6. This basically leads to an incorrect channel estimation, and to incorrect demodulation of all OFDM symbols of the payload portion 33 received thereafter. The succeeding frame preamble 22, 32 sequences should have a same time duration and be time-aligned.

One deployment scenario would be to cause loss of connection between the drone 6 and its remote control 5, thus causing the drone 6 to land or return to the operator's position.

Another deployment scenario would be to force the WLAN communications (either direction) between the remote control 5 and the drone 6 down to an OFDM modulation scheme using a lowest data rate, or even to an 802.11b transmission. This may result in a longer transmission time (airtime) of the OFDM signal, thereby assisting another system to tri-angulate as to where the remote control 5 may be located. In addition, this may result in a higher battery drain of both the remote control 5 and the drone 6.

A weaker deployment scenario (not shown) would be to interfere with a plurality of mobile devices that are attempting to camp on a cell of a cellular mobile system, such as for example 4G and 5G based systems, which are also OFDM-based. For the cellular system, there is usually an OFDM-based synchronization sequence transmitted on regular intervals, and mobile devices use these synchronization sequences as a basis for power, frequency and channel profile measurement when camping on the cell. However once camped, the respective mobile device may use dedicated OFDM symbols to iterate its measurements, and may not be affected by interference attempts on the fixed OFDM symbol anymore. Furthermore, in case the system 4 is on one side of the cell, its interference attempts may not be powerful enough to affect mobile devices located on an opposite side of the cell.

The invention claimed is:
1. A method of interference with a transmission of an Orthogonal Frequency-Division Multiplex, OFDM, signal,
wherein the OFDM signal comprises multiple data frames which respectively comprise a preceding frame preamble and a succeeding frame preamble,
wherein the method comprises:
receiving a succeeding frame preamble of a first data frame of the multiple data frames;
identifying a first radio power and a first equalization parameter associated with the received succeeding frame preamble;
determining a second radio power on a same order of magnitude as the first radio power, and a second equalization parameter differing from the first equalization parameter;
receiving a preceding frame preamble of a second data frame of the multiple data frames; and
retransmitting the succeeding frame preamble of the first data frame concurrently with a succeeding frame preamble of the second data frame, the retransmitted succeeding frame preamble comprising the second radio power and the second equalization parameter.

2. The method of claim 1,
wherein the second radio power is no more than 1,5 dB higher than the first radio power.

3. The method of claim 1,
wherein the second equalization parameter is orthogonal to the first equalization parameter.

4. The method of claim 1,
wherein the second equalization parameter is time-variant.

5. The method of claim 1, further comprising
identifying a first frequency offset associated with the received succeeding frame preamble; and
determining a second frequency offset differing from the first frequency offset;
wherein the transmitted succeeding frame preamble further comprises the second frequency offset.

6. The method of claim 1,
wherein the OFDM signal comprises an IEEE 802.11 Wireless Local Area Network, WLAN, signal.

7. The method of claim 1,
wherein the OFDM signal comprises a 3GPP cellular Radio Access Network, RAN, signal.

8. A system of interference with a transmission of an Orthogonal Frequency-Division Multiplex, OFDM, signal,
wherein the OFDM signal comprises multiple data frames which respectively comprise a preceding frame preamble and a succeeding frame preamble,
wherein the system comprises:
a radio transceiver, being configured to
receive a succeeding frame preamble of a first data frame of the multiple data frames;
identify a first radio power and a first equalization parameter associated with the received succeeding frame preamble;
a processor, being configured to
determine a second radio power on a same order of magnitude as the first radio power, and a second equalization parameter differing from the first equalization parameter;
the radio transceiver further being configured to
receive a preceding frame preamble of a second data frame of the multiple data frames; and
retransmit the succeeding frame preamble of the first data frame concurrently with a succeeding frame preamble of the second data frame, the retransmitted succeeding frame preamble comprising the second radio power and the second equalization parameter.

9. The system of claim 8,
wherein the second radio power is no more than 1.5 dB higher than the first radio power.

10. The system of claim 8,
wherein the second equalization parameter is orthogonal to the first equalization parameter.

11. The system of claim 8,
wherein the second equalization parameter is time-variant.

12. The system of claim 8,
wherein the radio transceiver is further configured to
identify a first frequency offset associated with the received succeeding frame preamble;
wherein the processor is further configured to
determine a second frequency offset differing from the first frequency offset; and
wherein the transmitted succeeding frame preamble further comprises the second frequency offset.

13. The system of claim 8,
wherein the OFDM signal comprises an IEEE 802.11 Wireless Local Area Network, WLAN, signal.

14. The system of claim 8,
wherein the OFDM signal comprises a 3GPP cellular Radio Access Network, RAN, signal.

* * * * *